United States Patent [19]
Corrigan, Jr.

[11] Patent Number: 5,947,409
[45] Date of Patent: Sep. 7, 1999

[54] SPRING FINGER ASSEMBLY FOR ENGAGING A SPOOL

[76] Inventor: Richard W. Corrigan, Jr., 4 Victoria La., Hawthorn Woods, Ill. 60047

[21] Appl. No.: 08/955,036

[22] Filed: Oct. 21, 1997

Related U.S. Application Data

[63] Continuation-in-part of application No. 08/734,115, Oct. 21, 1996, abandoned.

[51] Int. Cl.⁶ .......................... B65H 18/04; B65H 16/02; B65H 75/24; B65H 75/30
[52] U.S. Cl. .................................. 242/571.4; 242/571.5; 242/545.1; 242/422.4; 242/530.3
[58] Field of Search .............................. 242/571.4, 571.5, 242/577.1, 571, 545.1, 422.4, 422.9, 419.9, 530.3, 129.8, 155 R, 156; 464/81, 100, 101, 41, 45; 279/2.22; 269/48.1; 192/76

[56] References Cited

U.S. PATENT DOCUMENTS

| | | |
|---|---|---|
| 1,838,432 | 12/1931 | Mitchell . |
| 2,128,776 | 8/1938 | Howell . |
| 2,249,150 | 7/1941 | Magrath ............................... 242/571.5 |
| 2,895,578 | 3/1959 | Winchell . |
| 3,093,332 | 6/1963 | Jackson ................................ 242/571.4 |
| 3,157,258 | 11/1964 | Cronholm . |
| 3,157,406 | 11/1964 | Smith, Jr. et al. . |
| 3,242,696 | 3/1966 | Kaplan . |
| 3,285,528 | 11/1966 | Beindorf .............................. 242/571.5 |
| 3,375,995 | 4/1968 | Roman . |
| 3,395,553 | 8/1968 | Stout . |
| 3,405,791 | 10/1968 | Kaplan . |
| 3,411,684 | 11/1968 | Tison et al. . |
| 3,482,794 | 12/1969 | Beardsley . |
| 3,832,866 | 9/1974 | Thomson . |
| 4,058,192 | 11/1977 | Haigh . |
| 4,090,785 | 5/1978 | Weninger . |
| 4,109,770 | 8/1978 | Perles . |
| 4,273,299 | 6/1981 | Ness . |
| 4,323,202 | 4/1982 | Laverty ............................... 242/571.5 |
| 4,327,874 | 5/1982 | Bruno ................................... 242/571.5 |
| 4,527,683 | 7/1985 | Mathews . |
| 5,092,440 | 3/1992 | Nakano . |
| 5,297,750 | 3/1994 | Hunt . |
| 5,492,280 | 2/1996 | Corres et al. . |
| 5,570,564 | 11/1996 | Moore et al. . |
| 5,620,372 | 4/1997 | Takada et al. . |
| 5,626,309 | 5/1997 | Morgan . |

FOREIGN PATENT DOCUMENTS

| | | |
|---|---|---|
| 533299 | 11/1956 | Canada . |
| 463248 | 1/1992 | European Pat. Off. . |
| 479544 | 4/1992 | European Pat. Off. . |
| 5106641 | 4/1993 | Japan . |
| 5164140 | 6/1993 | Japan . |

*Primary Examiner*—John M. Jillions
*Attorney, Agent, or Firm*—Trexler, Bushnell, Giangiorgi & Blackstone, Ltd.

[57] ABSTRACT

A spring finger assembly (16) for a mechanism for transporting or tensioning thin membrane material that includes a shaft (14) and a roller (12) disposed about the shaft. The spring finger assembly (16) is mounted to the roller (12) for engaging a spool of thin membrane material. The spring finger assembly (16) comprises a plurality of interlocking spring fingers (30), each of which includes a leading portion (34) that extends free. The spring fingers (30) together define a generally cylindrical channel (32) for receiving the roller (12). Each spring finger (30) includes three hooks (40) and defines three apertures (42). The hooks (40) of each spring finger (30) are received by the apertures (42) of one of the other spring fingers (30) interlocking the one of the other spring fingers. The leading portion (34) of each spring finger (30) includes a leading edge (36) that is deflected for engaging the spool and includes two beveled ends (48) for facilitating the placement and removal of the spool. The roller (12) desirably is configured to impose a torque resistance between the spool and shaft (14).

30 Claims, 3 Drawing Sheets

5,947,409

SPRING FINGER ASSEMBLY FOR ENGAGING A SPOOL

CROSS REFERENCE

This is a continuation-in-part of U.S. patent application Ser. No. 08/734,115 filed Oct. 21, 1996 now abandoned.

TECHNICAL FIELD

The present invention relates to a device for use with mechanisms or systems for transporting or tensioning web material or other thin membrane material.

BACKGROUND ART

Mechanisms for transporting or tensioning web material used in printers, copiers, plotters for engineering or technical drawings, document scanners, facsimile machines, chart recorders, and the like, typically include one or more rollers that are engageable with spools of the web material. Such mechanisms are usually complex and include several interacting shafts, each of which has one or more rollers mounted thereto. Such mechanisms usually require extreme accuracy, which is difficult to obtain at least for an extended period of time due to, among other things, the force interactions between shafts and the large swings in tensile stress imposed on the web material during web transporting and tensioning. If the mechanism is not able to account for force interactions and the large changes in tensile stress, it often will result in wrinkling or possibly fracturing of the web material. Thus, the force interactions and large swings in tensile stress often impair system performance or cause outright system failure.

Although the changes in tensile stress imposed on the web material can be caused by several factors, one common factor is the inability of the rollers to suitably accommodate spools not meeting precise inner diameter requirements. A secure engagement between the roller and spool is necessary for the mechanism to achieve high precision and performance. Thus, unless the spools are manufactured within very tight tolerance, the rollers prevent the mechanisms from achieving high precision and performance.

Attempts have been made to address the problem of rollers not being tolerant of the inner diameters of spools. For example, it has been known to attach a flexible piece of metal to the rollers to enable the rollers to engage spools having different inner diameters. The piece of metal is attached by screws to the roller within a recessed area defined by the roller, and extends along a portion of the length of the roller and outward from the roller. The piece of metal may include a deflected portion at its leading edge for engaging the inner diameter of the spool.

Although such a flexible metal piece enables the rollers to accommodate a range of different inner diameters, it does have drawbacks. Most notably, the flexible metal piece prevents radial compliance between the inner diameter of the spool and the roller since the flexible metal piece simply forces a portion of the inner diameter of the spool outward. As a result, the flexible metal piece can cause "barrel wobble," which can affect the performance of the mechanism. Another drawback is that it is relatively time consuming to attach the flexible metal pieces to the rollers.

It is an object of the present invention to provide a spring finger assembly for a mechanism for transporting or tensioning web material or other thin membrane material that has a relatively high tolerance for variation of the inner diameter of a spool of thin membrane material.

It is a further object of the present invention to provide such a spring finger assembly for providing radial compliance between a roller and shaft of the mechanism and the spool of thin membrane material.

It is still a further object of the present invention to provide such a spring finger assembly that can easily be engaged with the roller.

DISCLOSURE OF INVENTION

The present invention provides a spring finger assembly for a mechanism for transporting thin membrane material that includes a shaft. The spring finger assembly is adapted to be disposed about the shaft and to engage a spool of thin membrane material. The spring finger assembly comprises a plurality of spring fingers, each of which includes a leading portion that extends free. If desired, a plurality of the spring finger assemblies may be disposed on the shaft in side-by-side relationship to define a spindle.

In a preferred embodiment of the invention, each spring finger assembly is mounted to a respective roller disposed about the shaft. The spring fingers are interlocking and generally arcuate and together define a generally cylindrical channel for receiving the roller. Each spring finger extends substantially the length of the roller and includes at least one hook desirably associated with an end of the spring finger opposite the leading portion, and defines at least one aperture. The at least one hook of each spring finger is received by the at least one aperture of one of the other spring fingers for engaging or interlocking the one of the other spring fingers. The at least one aperture of each spring finger receives the hook of an other one of the spring fingers for engaging or interlocking the other one of the spring fingers. The spring fingers are desirably interlocked such that the leading edge of each spring finger overlaps a proximal portion of the one of the other spring fingers.

The leading portion of each spring finger includes a leading edge that is deflected for engaging the spool. The leading edge desirably includes two beveled ends for facilitating the placement and removal of the spool. Additionally, each spring finger also includes a recess for receiving the leading portion of the one of the other spring fingers to facilitate flexing of the leading portion.

The spring finger assembly desirably is secured to the shaft or roller both rotationally and axially. In a preferred embodiment, the roller includes a pair of shoulders, each of which has a plurality of nubs for engaging the spring finger assembly. Each spring finger has a pair of opposed sides, each of which defines a pair of recesses for receiving the nubs and for engaging the spring finger assembly with the roller.

Desirably, each nub is engaged with two spring fingers and thus is received by one of the recesses of each of two of the spring fingers. Those two recesses are aligned with each other, and the top recess of the aligning recesses desirably is larger in size than the bottom recess also to facilitate flexing of the spring fingers.

The roller desirably is generally cylindrical and may have any suitable length. In a preferred embodiment, the roller is capable of imposing torque resistance during relative rotation between the hollow element and the shaft. The roller may, for example, comprise a hollow and preferably substantially cylindrical element adapted to be disposed about the shaft, and a spring adapted to be disposed about the shaft within a channel defined by the hollow element. With this embodiment of the roller, the spring desirably is a helical spring and includes a first portion engaged with the shaft, and a second portion in contact with the inside surface of the hollow element. The first and second portions desirably have different diameters, and are contiguous and joined together by a spring segment extending tangentially from the first portion to the second portion.

Desirably, the free inner diameter of the first portion (i.e., the inner diameter of the first portion of the spring if the spring were in a free or relaxed state) is slightly less than the diameter of the shaft so that the first portion engages the shaft. The free outer diameter of the second portion (i.e., the outer diameter of the second portion of the spring if the spring were in a free or relaxed state) desirably is slightly greater than the diameter of the channel defined by the hollow element so that the second portion engages the inside surface of the hollow element. Thus, when the spring is within the hollow element and disposed about the shaft, the first and second portions are in a partially stressed condition.

Accordingly, the spring finger assembly in accordance with a preferred embodiment of the invention provides radial compliance between the spool of thin membrane material and the roller and shaft. As a result, the spring finger assembly is more tolerant of the inner diameters of the spools and enables the thin membrane transporting mechanism to be useable with a wider range of sizes of spools. The spring finger assembly also prevents "barrel wobble" of the spool. The spring finger assembly can be installed onto the roller relatively quickly and easily.

Additionally, when the spring finger assembly is employed with the roller in accordance with a preferred embodiment, the resulting device is also adapted to provide torsional compliance between the spool and the shaft, which also tends to reduce or eliminates force interaction between shafts of a web material transporting or tensioning mechanism.

The spring finger assembly may be used to draw web material from the spool or wind web material onto the spool. If, in accordance with a preferred embodiment, a plurality of the spring finger assemblies and corresponding rollers are mounted along the shaft in side-by-side relationship for drawing the web material from a spool of web material or winding material onto the spool, a high level of spindle segmentation is provided. The spindle not only reduces or eliminates force interaction between spindles mounted on other shafts but also between spindle segments (i.e., along the length of the spindle). The spindle is particularly well-suited for use with variable width web material.

Still further, with the spindle embodiment, the spring finger assemblies of the spindle do not need to be positioned such that the spring fingers align with the spring fingers of the other spring finger assemblies. Rotational alignment of the spring finger assemblies on adjacent rollers is not required due to the self-centering function of the spring fingers. Additionally, due to the flexibility and symmetry of the spring fingers of each spring finger assembly, each spring finger assembly can provide essentially the same radial compliance regardless of the positioning of its spring fingers relative to the positioning of the spring fingers of the other spring finger assemblies.

The present invention may be used in a wide variety of applications relating to transporting or tensioning systems for any web material, such as, for example, paper, polymer film, or other thin membrane material. The invention may be used in copiers, laser printers, engineering drawing plotters, document scanners, facsimile machines, and chart recorders. The benefits of the present invention may also be realized in bar code label printers, especially those utilizing thermal transfer printing technology.

BRIEF DESCRIPTION OF DRAWINGS

The present invention and the advantages thereof will become more apparent upon consideration of the following detailed description when taken in conjunction with the accompanying drawings.

MODES FOR CARRYING OUT THE INVENTION

Figure 1:
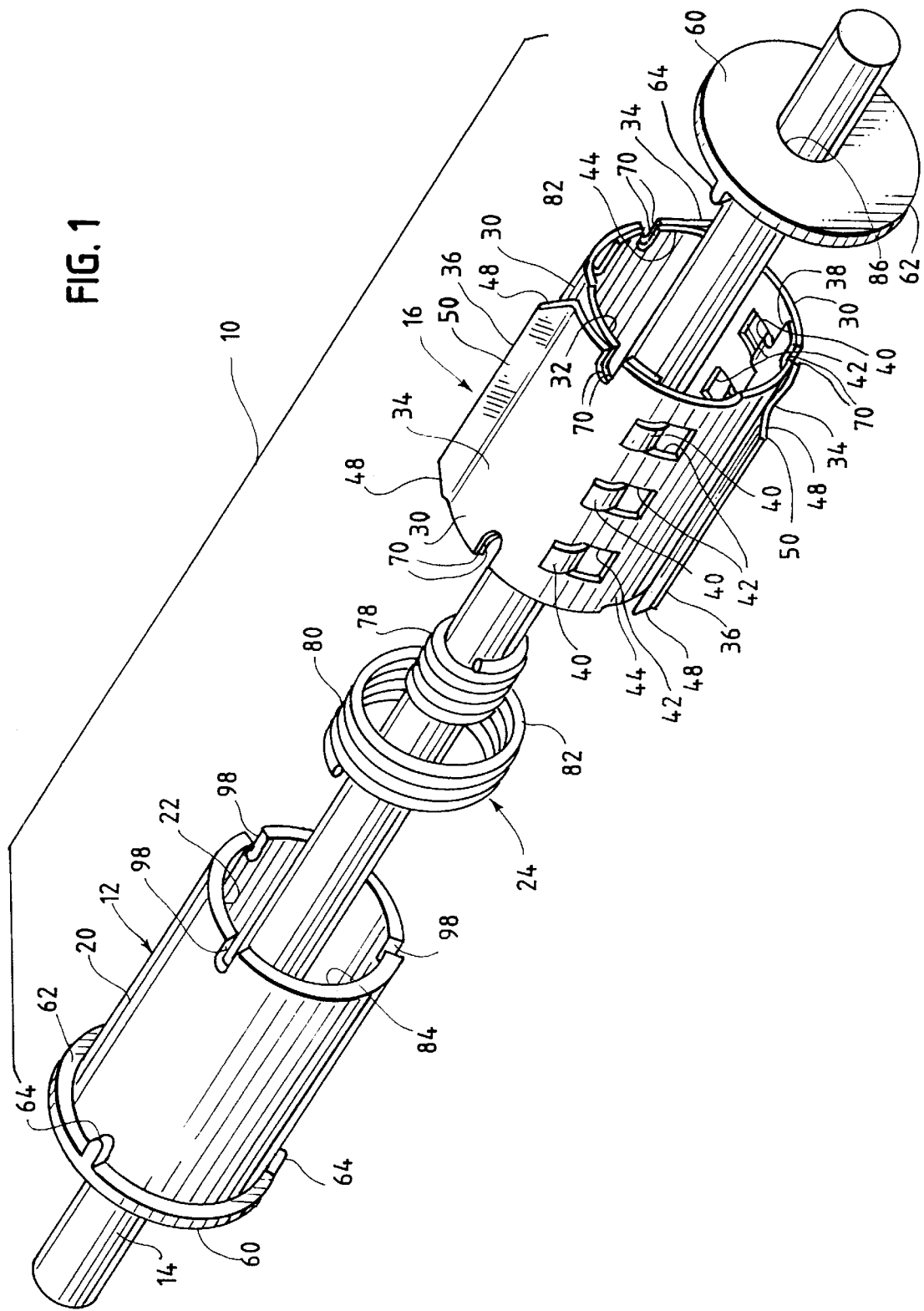
FIG. 1 is an exploded view illustrating a device comprising a spring finger assembly and roller in accordance with a preferred embodiment of the invention disposed about a shaft of a mechanism for transporting or tensioning thin membrane material.
Figure 2:
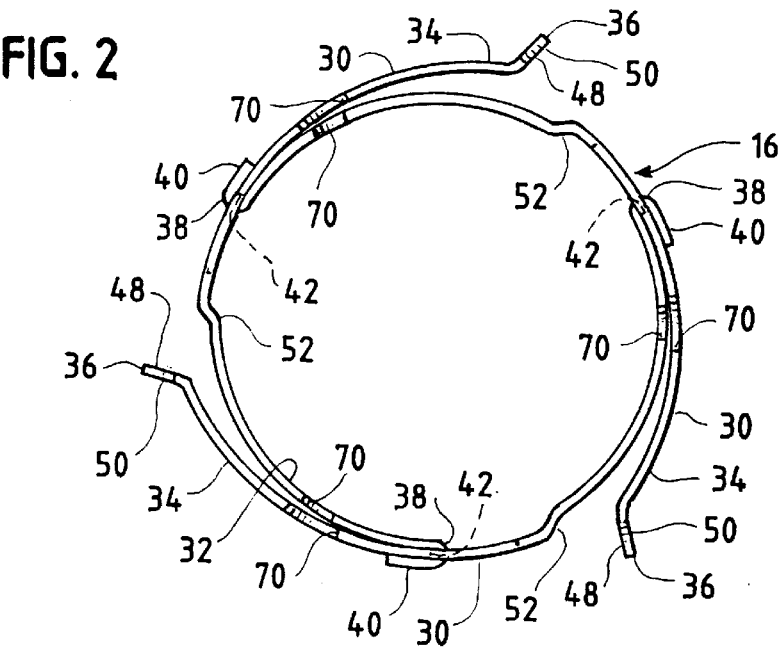
FIG. 2 is an end view of the spring finger assembly of FIG. 1.
Figure 3:
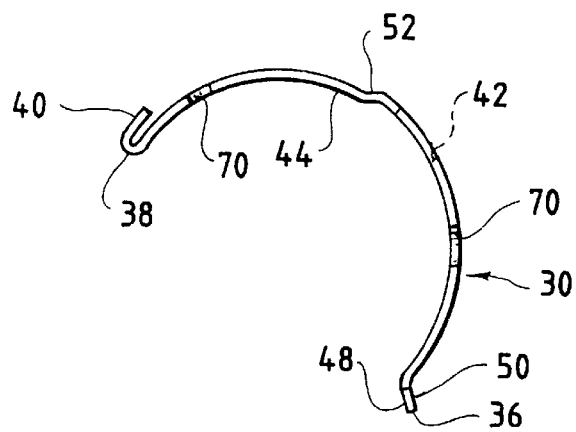
FIG. 3 is an end view of one of the spring fingers of the spring finger assembly of FIGS. 1 and 2.
Figure 4:
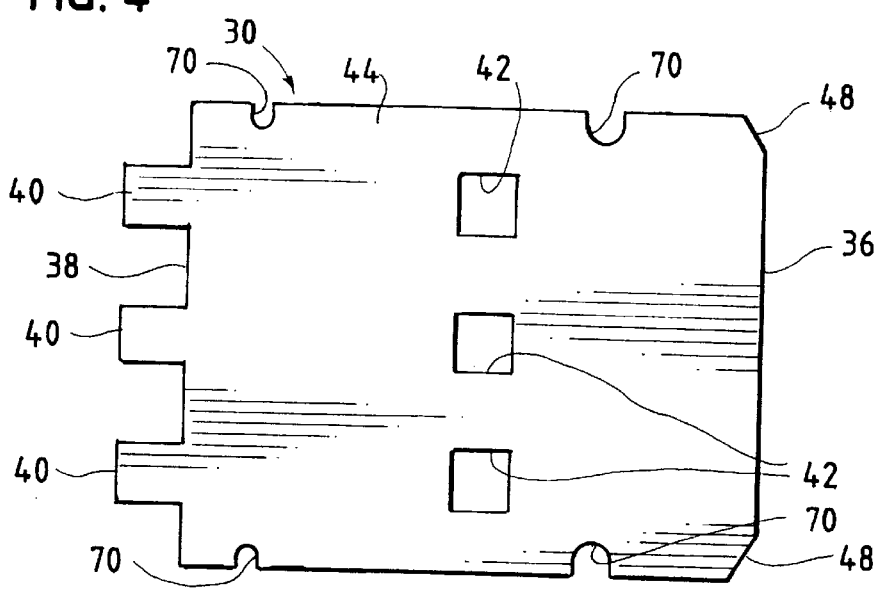
FIG. 4 is a plan view of the spring finger of FIG. 3 shown in a flattened condition for purposes of illustration.

As illustrated in FIGS. 1–4, the present invention in accordance with a preferred embodiment provides a device 10 in the form of a roller 12 mounted on a shaft 14 of a mechanism for transporting or tensioning web material or other thin membrane material, and a spring finger assembly 16 mounted to the roller 12 to engage a spool of the material during transport or tensioning of the material. The illustrated roller 12 includes a hollow and preferably cylindrical element 20 defining a channel 22 that desirably extends along the length of the hollow element 20 and a spring 24 received in the channel.

In the illustrated embodiment, the spring finger assembly 16 comprises three interlocking spring fingers 30 that together define a generally cylindrical channel 32 for receiving the roller 12. Each spring finger 30 is generally arcuate and is engageable with the other two spring fingers 30. Each spring finger 30 includes a leading portion 34 having a leading edge 36, and a proximal end 38 having three hooks 40. Each spring finger 30 defines three square-shaped apertures 42 for receiving the three hooks 40 of the one of the other spring fingers 30 to engage the one of the other spring fingers.

The leading portions 34 of the spring fingers 30 extend from the rollers 12 desirably in a direction opposite the intended direction of rotation of the device 10. The leading portion 34 of each spring finger 30 extends freely and desirably in an arcuate and cantilevered manner, with the degree of curvature of the leading portion 34 being less than the degree of curvature of the proximal portion 44 of the spring finger 30 (see, e.g., FIGS. 1 and 2). The arcuate and cantilevered configuration of the leading portion 34 further enhances the flexibility of the leading portion and further enhances its range of compliance with the spool.

Each spring finger 30 includes at its leading edge 36 a pair of beveled ends 48 to facilitate placement and removal of the spool, and a deflected portion 50 desirably extending all or most of the width of the spring finger 30. The deflected portion 50, which extends at an outward angle, engages the spool and is adapted to prevent or minimize rotation of the spool in one direction relative to the hollow element 20. If desired, each spring finger 30 may also define a recess 52 along its width adapted to receive the leading portion 34 of one of the other spring fingers 30 during deflection of the leading portion 34. The spring fingers 30 may be constructed of any suitable material, such as, for example, spring steel.

The spring finger assembly 16 desirably extends substantially the length of the roller 12 and is fixedly secured to the roller both in the axial and rotational directions in any suitable manner. In the illustrated embodiment, for example, each roller 12 includes a pair of hubs 60, at least one of which is removably engageable with the hollow element 20 to facilitate engagement and removal of the spring finger assembly 16. Each of the hubs 60 forms a circumferential shoulder 62 on the roller 12 having three U-shaped engaging nubs 64. Each of the opposed sides of each spring finger 30 defines a pair of U-shaped recesses 70 adapted to receive the nubs 64. Each nub 64 is received by one of the recesses 70 of each of two spring fingers 30 so that each nub is engaged with two spring fingers 30. The two recesses 70 receiving each nub 64 are aligned, with the top recess being larger than the bottom recess to facilitate flexing of the leading portion 34 of each spring finger 30. Thus, the recesses 70 of each opposed side of each spring finger 30 are different in size, with the recess 70 nearer the leading edge 36 being larger than the recess 70 nearer the proximal end 38. Each pair of aligning recesses 70 desirably are spaced 120° apart from each other.

The spring 24 desirably is a helical spring that includes first and second portions 78, 80 having different diameters. Desirably, the first and second portions 78, 80 are contiguous and joined together by a spring segment 82 that extends from the first portion 78 tangentially to the second portion 80.

The first portion 78 of the spring 24 is adapted to be disposed about the shaft 14 and to grippingly engage or clamp the shaft 14, and, thus, desirably the free inner diameter of the first portion 78 is slightly less than the diameter of the shaft 14. The second portion 80 of the spring 24 is adapted to contact the inside surface 84 of the hollow element 20 and, thus, desirably the free outer diameter of the second portion 80 is slightly greater than the diameter of the channel 22 of the hollow element 20. In a preferred embodiment, the free inner and outer diameters of the first portion 78 are less than the free inner and outer diameters of the second portion 80, respectively.

The spring 24 is defined by a spring wire having a circular cross section substantially along the length of the spring 24. Alternatively, if desired, the spring wire may have a rectangular cross section along some or all of the length of the spring 24 to provide increased surface area for gripping or engaging the shaft 14 or the inside surface 84 of the hollow element 20.

The hollow element 20 is adapted to be disposed about the shaft 14 and mounted to the shaft in any suitable manner that permits rotation of the hollow element 20 relative to the shaft. The hubs 60 may be joined to the ends of the hollow element 20 in any suitable manner, such as by a pressure or friction fit, solder, an adhesive or complementary screw threads. In the illustrated embodiment, the hollow element 20 includes a plurality of U-shaped recesses 98 that receive the nubs 64 by friction fit. Alternatively, the hubs 60 and hollow element 20 may be integral.

Each hub 60 defines an aperture 86 for receiving the shaft 14 and a bearing surface 88, and is disposed about the shaft 14 in any suitable manner that permits rotation of the device 10 relative to the shaft 14. The hollow element 20 may be secured axially to the shaft 14 in any suitable manner such as, for example, by a pair of retaining rings or the like.

The roller 12 in accordance with a preferred embodiment of the invention is adapted to impose torque resistance during relative rotation between the hollow element 20 and the shaft 14. For example, as the shaft 14 is rotated in a first direction, the first portion 78 of the spring 24 tends to tighten or clamp onto the shaft 14, which prevents the first portion 78 from rotating relative to the shaft 14. At the same time, the second portion 80 of the spring 24 is in contact with the inside surface 84 of the hollow element 20, and slides or slips against the hollow element 20. As a result, the outside diameter of the second portion 80 of the spring 24 and the inside surface 84 of the hollow element 20 perform a clutching function, and provide a torque resistance through the spring 24 relative to the rotating shaft 14. The connecting segment 82 of the spring 24 deflects, allowing a limited rotation of the hollow element 20 relative to the shaft 14 before reaching equilibrium with the frictional drag of the second portion 80 of the spring. Instead, the device 10 may be disposed about a stationary shaft 14 and operate in a similar manner during transport or tensioning of the material and during relative rotation between the hollow element 20 and the shaft 14.

If desired, the device 10 in accordance with a preferred embodiment of the invention may also impose an opposite torque resistance during relative rotation between the hollow element 20 and the shaft 14 in a reverse direction. For example, upon rotation of the shaft 14 in a second direction, the second portion 80 of the spring 24 tends to press outwardly or clamp against the inside surface 84 of the hollow element 20, which prevents movement of the second portion 80 of the spring 24 relative to the hollow element 20. At the same time, the first portion 78 of the spring 24 tends to relieve its clamping force on the shaft 14, which allows the spring to slip or slide relative to the shaft 14. As a result, a controlled torque resistance of the shaft 14 relative to the device 10 is provided.

If desired, a plurality of the devices 10 may be mounted on the shaft 14. In accordance with a preferred embodiment of the invention, for example, a plurality of the devices 10 are be mounted on the shaft 14 in side-by-side relationship to form a spindle 100 for engaging the spool of web material (see, e.g., FIG. 5). Rotational alignment of the spring finger assemblies 16 on the adjacent rollers 12 of the spindle 100 is not required during mounting of the spool because the interlocking spring fingers 30 of each spring finger assembly 16 are self centering with respect to the other spring fingers of the spring finger assembly and with respect to the spring fingers of the other spring finger assemblies. Additionally, the spindle embodiment of the present invention provides spindle segmentation and is particularly well suited for use with variable width web material.

Figure 5:
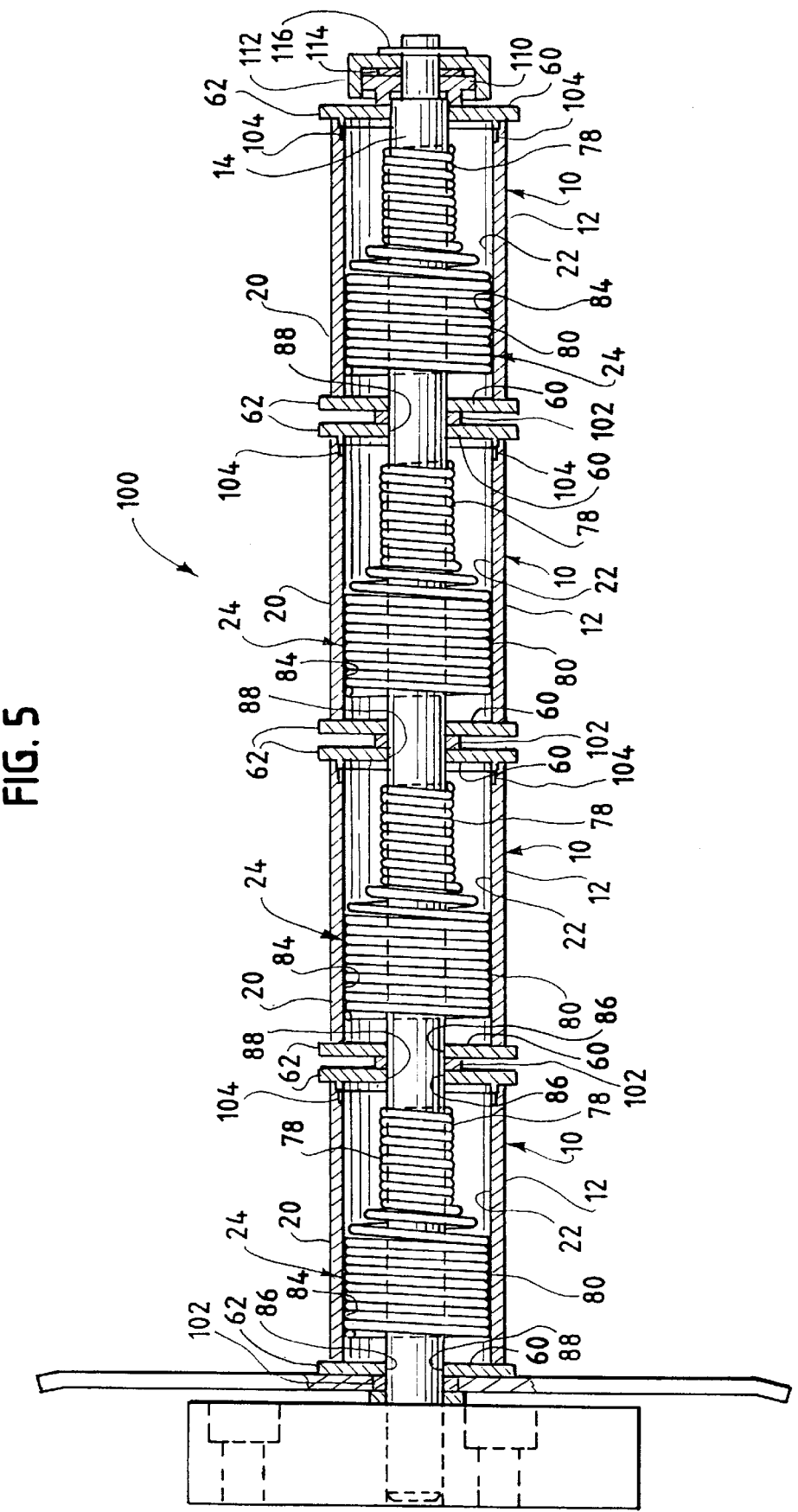
FIG. 5 is a cross section view taken along a longitudinal axis of a spindle comprising a plurality of the devices of FIG. 1 mounted side by side on the shaft, illustrating the rollers with the spring finger assemblies removed for clarity.

In the spindle embodiment of FIG. 5, each of the devices 10 includes a spacer 102 at one end of the device 10 and abutting one of the other devices 10. One of the hubs 60 of each of the devices 10 is removable and is illustrated as having a plurality of snap tabs 104 engageable with the respective hollow element 20 in complementary grooves defined by the inside surface 84 of the hollow element 20. In the illustrated embodiment, the spindle 100 is axially secured to the shaft 14 by a washer 110 that preferably is keyed to the shaft 14, a cap 112 that preferably is keyed to the shaft 14, a wave washer 114 disposed between the washer 110 and the cap 112, and a retaining ring 116.

If desired, a roller bearing preferably in the form of a one-directional roller clutch bearing may be disposed between the first portion 78 of the spring 24 and the shaft 14. The roller clutch bearing is adapted to permit the device 10 to rotate freely in one direction. The Drawn Cup Needle Roller Bearing or the Drawn Cup Needle Roller Clutch manufactured by The Torrington Company of Torrington, Conn., for example, can be used.

Accordingly, the spring finger assembly 16 in accordance with a preferred embodiment of the invention is adapted to provide radial compliance between the spool of material and the shaft 14. The illustrated roller 12 is adapted to provide torque resistance in either direction, depending upon the direction of relative rotation between the shaft 14 and the hollow element 20. The magnitude of the respective torque resistances can be substantially the same or, if desired, different. The respective magnitudes can be predetermined by the stiffness of the spring 24, the length of the connecting segment 82, the amount of the mutual load on the spring, the frictional characteristics of the spring, the diameters of the respective components (e.g., the free diameters of the first and second portions 78, 80 of the spring, the inner diameter of the hollow element 20, and the diameter of the shaft 14), and other design characteristics.

The present invention also reduces or eliminates force interaction between the shafts 14 of a web material transporting or tension mechanism, and also enables the web material to undergo large swings in tensile stress in a gradual manner. As a result, the present invention reduces the possibility of wrinkling or fracture of the web material during transport or tensioning.

The present invention may be used in a wide variety of web transporting or tensioning mechanisms for any web material, such as, for example, paper, polymer film, or other thin membrane material. The invention may be used in copiers, laser printers, engineering drawing plotters, document scanners, facsimile machines, and chart recorders. The benefits of the present invention may also be realized in bar code label printers, especially those utilizing thermal transfer printing technology.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A spring finger assembly for a mechanism having a shaft for transporting or tensioning a thin membrane material disposed about a spool, the spring finger assembly adapted to be disposed about the shaft and to engage the spool of thin membrane material, the spring finger assembly comprising a plurality of interlocking spring fingers that together define a channel adapted to receive the shaft, each spring finger including a leading portion that extends free for engaging the spool.

2. The spring finger assembly of claim 1 wherein each leading portion terminates in a leading edge that is deflected for engaging the spool.

3. The spring finger assembly of claim 1 wherein each leading portion terminates in a leading edge having at least one beveled end.

4. The spring finger assembly of claim 1 wherein the spring finger assembly is adapted to be mounted on a roller of the mechanism.

5. The spring finger assembly of claim 4 wherein each spring finger extends substantially the length of the roller.

6. The spring finger assembly of claim 4 wherein at least one of the spring fingers includes a pair of opposed sides, and each side includes a recess adapted to receive a respective portion of the roller.

7. The spring finger assembly of claim 1 wherein each spring finger defines at least one aperture and includes at least one hook, the hook of each spring finger adapted to be received by the aperture of one of the other spring fingers.

8. The spring finger assembly of claim 7 wherein each leading portion terminates in a leading edge that is deflected for engaging the spool and that includes at least one beveled end.

9. The spring finger assembly of claim 7 wherein each spring finger includes a recessed portion adapted to receive the leading portion of one of the other spring fingers during deflection of said leading portion.

10. The spring finger assembly of claim 7 wherein there are three interlocking spring fingers and each spring finger defines three apertures and three hooks.

11. A spring finger assembly for a mechanism having a shaft for transporting or tensioning a thin membrane material disposed about a spool, the spring finger assembly adapted to be disposed about the shaft and to engage the spool of thin membrane material, the spring finger assembly comprising a plurality of spring fingers, each spring finger including a leading portion that extends free for engaging the spool, wherein the spring finger assembly is adapted to be mounted on a roller of the mechanism, and wherein the spring fingers are interlocking and together define a channel adapted to receive the roller.

12. A spring finger assembly for a mechanism having a shaft for transporting or tensioning a thin membrane material disposed about a spool, the spring finger assembly adapted to be disposed about the shaft and to engage the spool of thin membrane material, the spring finger assembly comprising a plurality of spring fingers, each spring finger including a leading portion that extends free for engaging the spool, wherein each spring finger includes a proximal portion, the proximal portion and the leading portion each being generally arcuate, and wherein the degree of curvature of the leading portion is less of the degree of curvature than the proximal portion.

13. A spring finger assembly for a mechanism having a shaft and a roller associated with the shaft for transporting or tensioning a thin membrane material disposed about a spool, the spring finger assembly adapted to be mounted on the roller and to engage the spool of thin membrane material, the spring finger assembly comprising a plurality of interlocking spring fingers defining a channel for receiving the roller and at least one aperture, each spring finger having at least one hook and a leading portion that extends free for engaging the spool, the hook of each spring finger adapted to be received by the aperture of one of the other spring fingers.

14. The spring finger assembly of claim 13 wherein each finger is generally arcuate and has a pair of ends, the hook being associated with one of the ends.

15. The spring finger assembly of claim 13 wherein each leading portion terminates in a leading edge that is deflected for engaging the spool and has at least one beveled end.

16. The spring finger assembly of claims 13 wherein each spring finger extends substantially the length of the roller.

17. The spring finger assembly of claim 13 wherein each of the spring fingers includes a pair of opposed sides, and each side including a recess adapted to receive a respective portion of the roller.

18. The spring finger assembly of claim 13 wherein each spring finger includes a proximal portion, the proximal portion and leading portion being generally arcuate, and wherein the degree of curvature of the leading portion is less than the degree of curvature than the proximal portion.

19. A device for a mechanism having a shaft for transporting or tensioning thin membrane material disposed about a spool, the device adapted to engage the spool of thin membrane material and be mounted to the shaft of the mechanism, the device comprising:

(a) a roller adapted to be disposed about the shaft, each roller having a pair of spaced shoulders and each shoulder having a plurality of engaging nubs; and (b) a spring finger assembly mounted on the roller for engaging the spool of thin membrane material, the spring finger assembly comprising a plurality of interlocking spring fingers together defining a channel receiving the roller and at least one aperture, each spring finger having at least one hook associated with a proximal end of the spring finger, a leading portion opposite the proximal end that extends free and overlaps a portion of one of the other spring fingers, and a pair of opposed sides, each side defining a plurality of recesses receiving the engaging nubs to engage the roller, the hook of each spring finger adapted to be received by the aperture of one of the other spring fingers.

20. The device of claim 19 wherein each nub engages two spring fingers.

21. The device of claim 20 wherein each nub is received by a respective recess of each of the two spring fingers, the two recesses being aligned and one of the two recesses being larger than the other of the two recesses.

22. The device of claim 19 wherein each leading portion terminates in a leading edge that is deflected for engaging the spool and that has a pair of beveled ends.

23. The device of claim 19 wherein each spring finger includes a proximal portion, the proximal portion and leading portion being generally arcuate, and wherein the degree of curvature of the leading portion is less than the degree of curvature than the proximal portion.

24. The device of claim 19 wherein the roller comprises:
(a) a hollow element defining a channel and adapted to be disposed about the shaft; and
(b) a spring adapted to be received within the channel of the hollow element and disposed about the shaft, the spring including first and second portions each having free inner and outer diameters, the first portion adapted to engage the shaft during relative rotation between the shaft and the hollow element to provide torque resistance relative to the shaft during said relative rotation.

25. The device of claim 24 wherein the free outer diameter of the first portion is less than the free outer diameter of the second portion.

26. The device of claim 25 wherein the free inner diameter of the first portion is less than the free inner diameter of the second portion.

27. The device of claim 19 wherein a plurality of other devices are mounted to the shaft adjacent the device in a side-by-side manner to define a spindle, each of the other devices comprising:
(a) a roller adapted to be disposed about the shaft, each roller having a pair of spaced shoulders and each shoulder having a plurality of engaging nubs; and
(b) a spring finger assembly mounted on the roller for engaging the spool of thin membrane material, the spring finger assembly comprising a plurality of interlocking spring fingers together defining a channel receiving the roller, each spring finger having at least one hook associated with a proximal end of the spring finger, a leading portion opposite the proximal end that extends free and overlaps a portion of one of the other spring fingers, and a pair of opposed sides, each side defining a plurality of recesses receiving the engaging nubs to engage the roller, the hook of each spring finger adapted to be received by the aperture of one of the other spring fingers.

28. A spindle for a mechanism having a shaft for transporting or tensioning thin membrane material disposed about a spool, the spindle comprising a plurality of spring finger assemblies adapted to be disposed about the shaft in side-by-side relationship, each spring finger assembly comprising a plurality of spring fingers, each spring finger including a leading portion that extends free, the leading portion adapted to extend generally tangentially from the shaft for engaging the spool.

29. The spindle of claim 28 further comprising a plurality of rollers disposed about the shaft in a side-by-side relationship, each spring finger assembly being mounted to a respective roller.

30. A spindle for a mechanism for transporting or tensioning thin membrane material disposed about a spool, a spindle adapted to engage the spool of thin membrane material, the spindle comprising a plurality of spring finger assemblies adapted to be disposed about the shaft in side-by-side relationship, each spring finger assembly comprising a plurality of spring fingers, each spring finger including a leading portion that extends free for engaging the spool, the spindle further comprising a plurality of rollers disposed about the shaft in a side-by-side relationship, each spring finger being mounted to a respective roller, wherein the spring fingers of each spring finger assembly are interlocking and together define a channel adapted to receive the respective roller.

* * * * *